United States Patent [19]
McCarville et al.

[11] Patent Number: 5,833,786
[45] Date of Patent: Nov. 10, 1998

[54] TITANIUM RADIUS FILLER FOR USE IN COMPOSITE INTERFACES

[75] Inventors: Douglas A. McCarville, Auburn; John S. Howitt, Jr.; Mark L. Younie, both of Seattle, all of Wash.

[73] Assignee: The Boeing Company, Seattle, Wash.

[21] Appl. No.: 648,825

[22] Filed: May 16, 1996

[51] Int. Cl.$^6$ ...................................................... B32B 7/08
[52] U.S. Cl. ............................. 156/92; 156/93; 264/258; 52/745.19
[58] Field of Search ...................... 156/92, 93; 264/258; 52/745.19

[56] References Cited

U.S. PATENT DOCUMENTS

| | | | |
|---|---|---|---|
| 4,109,435 | 8/1978 | Loyd | 52/309.1 |
| 4,206,895 | 6/1980 | Olez | 244/123 |
| 4,256,790 | 3/1981 | Lackman et al. | 428/73 |
| 4,331,495 | 5/1982 | Lackman et al. | 156/93 |
| 4,966,802 | 10/1990 | Hertzberg | 428/119 |
| 5,556,565 | 9/1996 | Kirkwood et al. | 219/633 |
| 5,639,535 | 6/1997 | Mccarville | 428/119 |

*Primary Examiner*—M. Nuzzolillo
*Assistant Examiner*—Steven H. VerSteeg
*Attorney, Agent, or Firm*—Christensen O'Connor Johnson & Kindness PLLC

[57] ABSTRACT

A method for fabricating composite parts having improved pulloff strengths between portions of the composite part. In one embodiment, a sine wave spar is formed from two U-shaped channels having opposing flanges and a central web. The U-shaped channels are joined along the webs. The triangular gaps between the edges of the joined U-shaped channels are filled using a titanium radius filler that is configured to fit within the gaps. After the titanium radius filler is placed within the gaps, additional layers of composite material are placed over the titanium radius filler and the flanges of the U-shaped channels to form the caps of the I-beam. The resulting composite workpiece is then placed within appropriate tooling and cured within an autoclave. In other embodiments, the method of the invention is used to form spars, ribs, stringers, or bulkheads from composite materials.

11 Claims, 5 Drawing Sheets

TITANIUM RADIUS FILLER FOR USE IN COMPOSITE INTERFACES

FIELD OF THE INVENTION

The present invention relates to methods for fabricating composite parts, and more specifically to methods for enhancing the pulloff strength of integral web/cap composite interfaces.

BACKGROUND OF THE INVENTION

The use of high strength fiber-reinforced composite materials in the manufacture of aircraft and other lightweight structures has increased steadily since the introduction of such materials. Composite materials have a high strength-to-weight ratio and stiffness. These properties make composite materials attractive for use in the design of lightweight structures. Some of the drawbacks to using composite materials have been their relatively high fabrication costs, difficulties in manufacturing defect-free parts and poor damage tolerance. Generally, it has been difficult to produce parts formed of high strength composite materials that have the same damage tolerance and same fabrication cost as comparable metal parts.

One area of structural and fabrication concern in composite parts is abrupt geometry changes such as the sharp radius of curvature between the webs and caps or flanges commonly found on composite spars, ribs, bulkheads, etc. Generally, in such applications a planar or sine wave shear web is joined to a highly loaded cap or flange at an acute angle. Due to difficulties in part fabrication and overall part geometry, the layers of composite material forming the shear web generally do not extend the entire width of the caps or flanges. In addition, the caps or flanges generally carry much greater loads than the shear webs. Thus, the flanges often include additional reinforcing layers of composite material that are placed over the top of the layers of composite material that form the webs and a portion of the flanges.

Due to the highly loaded nature of the caps or flanges, there is a concern that the loads applied to the caps and flanges will result in separation between the reinforcing cap plies of composite material and the underlying web plies of composite material that are joined to form the flanges. This is of particular concern in composite structures that carry large out-of-plane loads that tend to pull the caps or flanges away from the shear webs to which they are joined. Currently, composite structures that undergo large out of plane loads generally use "chicken fasteners" that extend through the cap plies and web plies of composite material to ensure that the layers of composite material remain joined during use of the composite part. For example, composite wing spars and ribs often incorporate chicken fasteners to ensure that through the thickness of the flanges they remain joined to the shear webs during loading.

To ensure that out of plane loads do not pull the caps or flanges off of the underlying composite structure, it is desirable in many applications for the interface between the caps and underlying structure to support pulloff loads on the order of 4,000 to 7,000 lbs/in. Such magnitudes of pulloff loads are greater than are typically achievable using current co-cured composite material technology. Thus, as described above, such highly loaded composite structures generally incorporate chicken fasteners to increase the maximum pulloff loads.

The use of chicken fasteners in composite parts generally increases both the weight and fabrication complexity of the finished part. In addition, such fasteners are often an area of concern throughout the maintenance lifetime of the composite part. The fasteners must be frequently inspected to ensure that they do not come loose during the cyclic loading that composite parts often undergo.

As can be seen from the discussion above, there exists a need for improved methods of fabricating composite parts that improve the pulloff strength in highly loaded structures such as the flanges or caps of spars, ribs or bulkheads. The present invention is directed towards fulfilling this need.

SUMMARY OF THE INVENTION

The present invention is a method of composite fabrication and resulting composite structure that increases the pulloff strengths of various composite parts. In one method of the invention, a composite structure having an I-cross-section is formed. Two U-shaped channel structures are formed from layers of composite material so that each channel structure has a centrally located shear web and opposing flanges. The two U-shaped channels are joined along the shear webs to form a composite workpiece having an I-cross-section. A titanium radius filler is formed to fit within a generally triangular gap formed between the flanges of the two joined U-shaped channel structures. The titanium radius filler is placed into the gap between the joined U-shaped channel structures. Additional cap layers of composite material are then placed over the titanium radius filler and the joined flanges of the U-shaped channel structures to complete the formation of the flanges of the formed composite workpiece. The resulting composite workpiece is then cured to form the completed part.

In accordance with other aspects of the invention, the shear web has a sine wave contour. In one embodiment of the invention, the titanium radius filler has a T-shaped cross-section while in another embodiment, the titanium radius filler has a generally triangular cross-section formed of two arcuate sides and an approximately flat side.

In accordance with still other aspects of the invention, the titanium radius filler is first treated by chromic acid anodizing in order to improve the bond strength between the titanium and the surrounding adhesive in the composite material. In additional embodiments of the invention, the titanium could be treated with other processing methods to increase bond strength.

In yet other embodiments of the invention, the titanium radius filler can be fabricated to fill gaps between other composite structures. For example, a titanium radius filler having a cross-shaped cross-section can be used to fill the gap between four composite subassemblies that are joined to form a composite part having a cross-shaped cross-section.

The invention also encompasses the composite structures formed in accordance with methods of the invention.

The invention's use of titanium radius filler increases the resulting pulloff strengths of the formed composite parts. The titanium radius filler has generally homogeneous properties that allow it to increase the out of plane strength of the formed composite part. In addition, the titanium radius filler helps to reduce the stress concentrations within the formed composite part near the titanium radius filler as compared to radius fillers formed of unidirectional composite prepreg.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
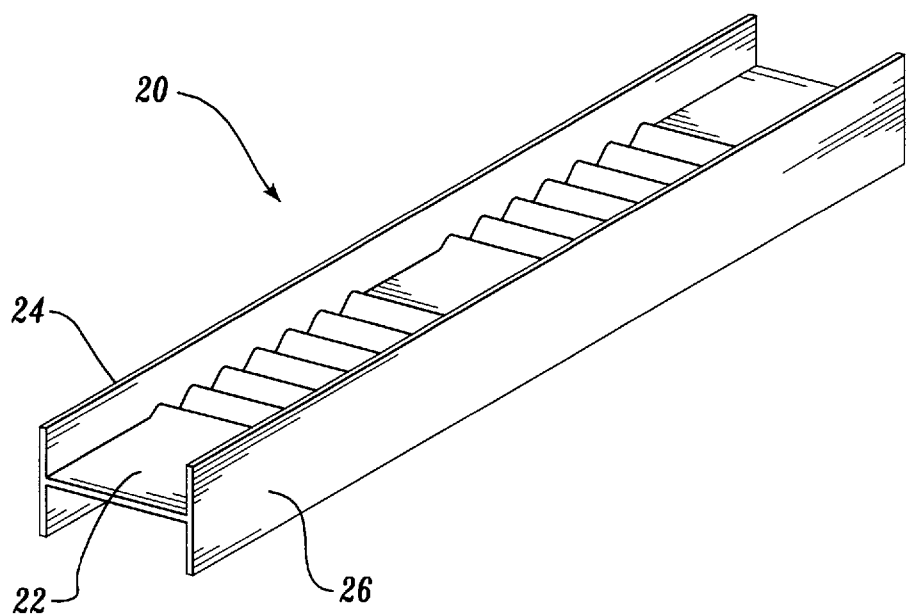
FIG. 1 is a perspective view of an exemplary sine wave spar fabricated in accordance with the invention.

The present invention is a method to fabricate composite parts with improved pulloff strengths between the shear webs and flanges or caps of the composite parts. The invention is described below with respect to a preferred embodiment used to form an I-beam or sine wave spar 20 (FIG. 1). However, the invention may be used to form a wide variety of composite structures. Similarly, the preferred embodiment is described below with respect to forming a composite sine wave spar out of a fiber reinforced, epoxy matrix prepreg composite material. However, the invention may be used with various composite materials, including composite prepregs having an epoxy or bismaleimide matrix reinforced with either unidirectional or cloth fibers, such as fiberglass, graphite or Kevlar®.

FIG. 1 illustrates a sine wave spar 20 fabricated using a titanium radius filler in accordance with the invention. As best illustrated in FIG. 1, the sine wave spar 20 is generally an I-beam having a sine wave central web 22 that extends between opposing left and right spar caps 24 and 26, respectively.

In the preferred embodiment, the sine wave spar 20 is fabricated using subassemblies preformed of layers of composite prepreg that are then joined together in an assembly process to form a composite workpiece. The composite workpiece is formed within a tooling concept that supports the prepreg composite material during subsequent curing. The formed composite workpiece and tooling concept are placed within a vacuum bag or diaphragm and are compacted and cured within an autoclave under high temperatures and pressures to produce the finished composite sine wave spar 20.

Figure 2:
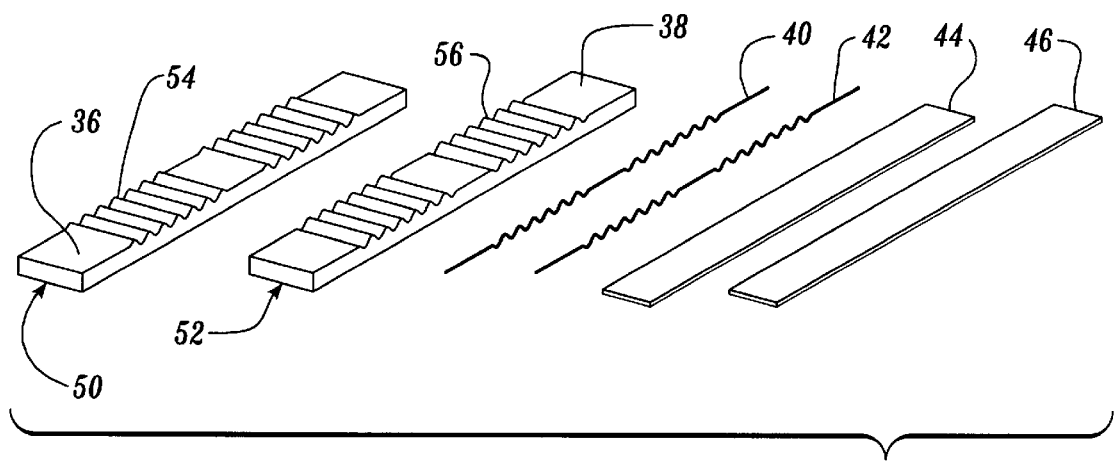
FIG. 2 is a perspective view of the upper and lower tool inserts and composite subassemblies used to form the sine wave spar.
Figure 9:
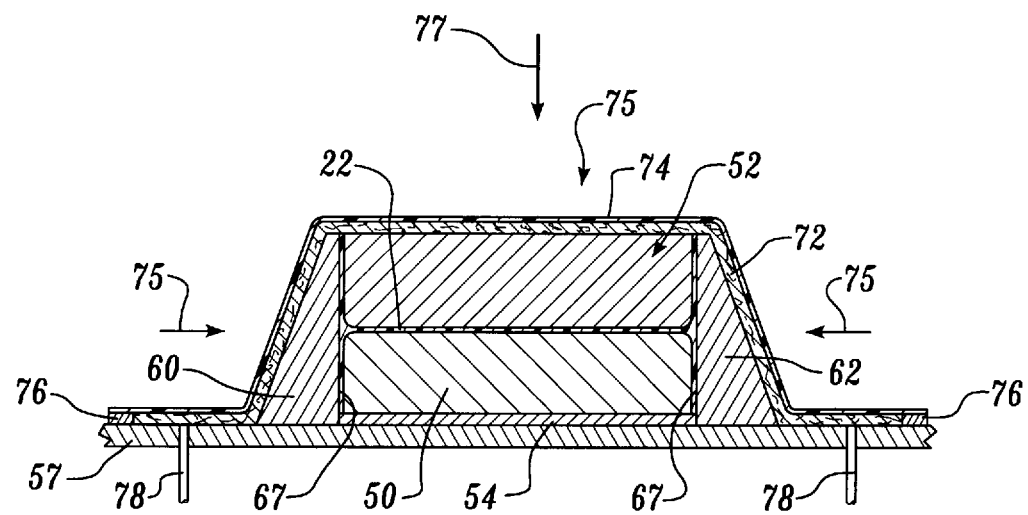
FIG. 9 is a cross-section of the assembled sine wave spar tooling and composite workpiece.

In the preferred embodiment, the sine wave spar 20 is assembled from a series of preformed subassemblies including lower and upper channel structures such as U-shaped channels 36 and 38 (shown in FIG. 2 laid over lower and upper tool inserts 50 and 52), left and right radius fillers 40 and 42, and left and right caps strips 44 and 46. The lower and upper U-shaped channels 36 and 38 are formed by laying up individual layers of composite prepreg material over lower and upper tool inserts 50 and 52 (FIGS. 2 and 9). Each tool insert 50 and 52 is generally rectangular and includes a forming surface 54 and 56 (FIG. 2), respectively. Each forming surface 54 and 56 has a sine wave contour corresponding to the contour desired on the central web 22 of the formed composite sine wave 20.

Figure 12:
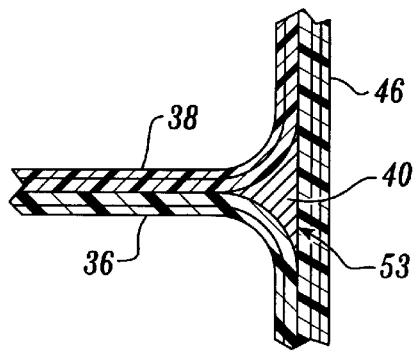
FIG. 12 is a cross-section of a portion of the sine wave spar.

Layers of composite prepreg material are laid up on the forming surfaces 54 and 56 so that the layers of prepreg follow the sine wave contours of the forming surfaces. The edges of the layers of prepreg wrap around the opposing edges of the tool inserts 50 and 52 to form the opposing peripheral flanges of the lower and upper U-shaped channels 36 and 38 (FIG. 12). The layers of composite prepreg material can be placed over the tool inserts 50 and 52 using hand lay-up procedures, automated tape laying equipment, or other appropriate fabrication methods.

The left and right cap strips 44 and 46 (FIG. 2) are formed by laying up individual layers of composite prepreg material on a tool (not shown) having a surface corresponding to the contour of the edges of the upper and lower tool inserts 50 and 52. The left and right cap strips 44 and 46 can be laid up by hand, using an automated tape-laying equipment, or other appropriate fabrication method.

The left and right radius fillers 40 and 42 (FIG. 2) have a triangular cross-section and are formed of titanium, as described in more detail below. The cross-section of the radius fillers are configured to allow them to fit within a triangular gap 53 (FIG. 12) formed between the lower and upper U-shaped channels 36 and 38 after assembly, as described below.

Figure 3:
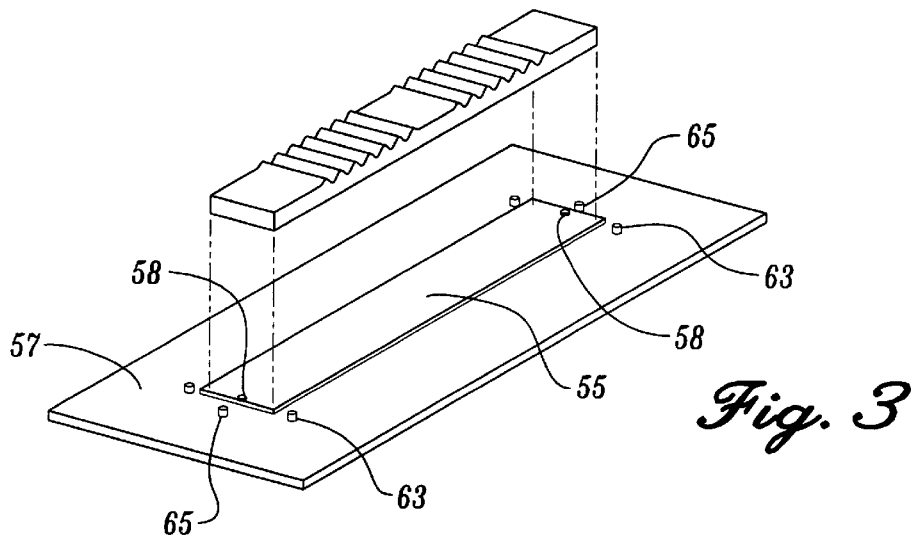
FIG. 3 is a partially exploded view of the upper tool insert and baseplate.

After the lower and upper U-shaped channels 36 and 38 are fabricated, the lower tool insert 50 is placed on a flat gauge sheet 55 (FIG. 3). The gauge sheet 55 is mounted on a rigid rectangular base plate 57. The base plate 57 has a larger surface area than the gauge sheet 55 and supports the tooling during processing, as described below.

Figure 4:
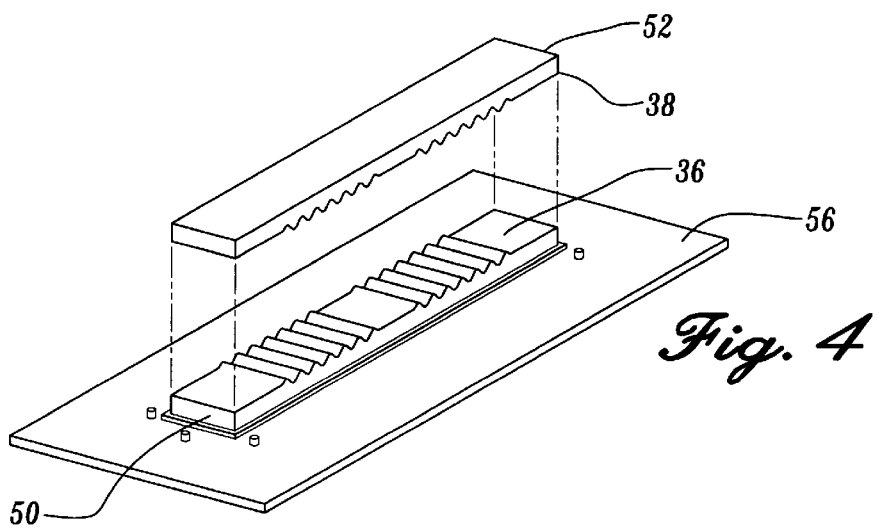
FIG. 4 is a partially exploded view of the upper and lower tool inserts and baseplate.

The lower tool insert 50 is indexed in a predetermined location on the gauge sheet 55 and base plate 57 using a plurality of indexing pins 58 in a manner well known in the art. The indexing pins 58 extend upward from the surface of the base plate 57 and gauge sheet 55 and engage recesses (not shown) in the lower surface of the lower tool insert 50. After the lower tool insert 50 is indexed, the upper tool insert 52 and thus, upper U-shaped channel 38 is inverted and placed on top of the lower tool insert 50 and lower U-shaped channel 36 and aligned (FIGS. 4 and 5) in a manner well known in the art. For example, indexing pins (not shown) can extend upward from the upper surface of the lower tool insert 50 to engage recesses (not shown) in the lower surface of the upper tool insert 52.

Figure 5:
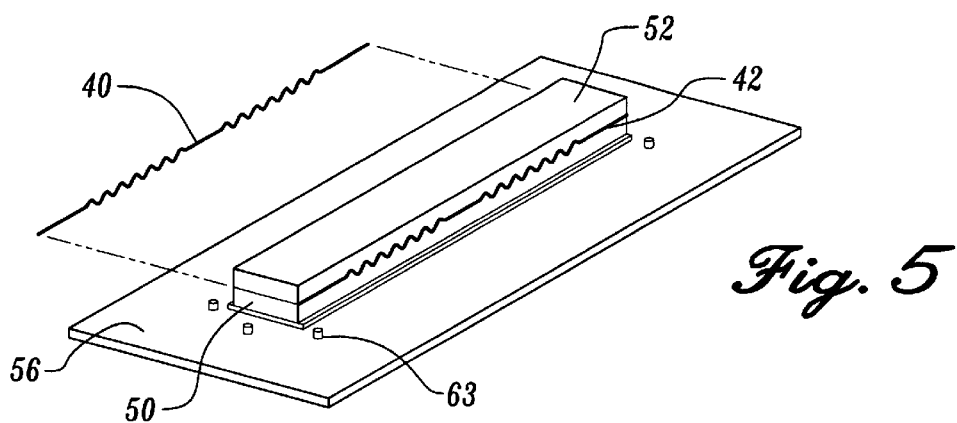
FIG. 5 is a partially exploded view of the upper and lower tool inserts and radius fillers.
Figure 6:
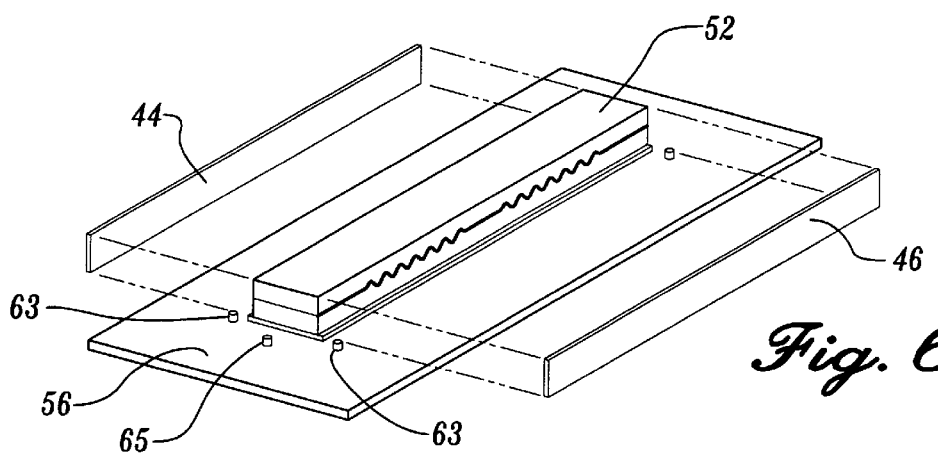
FIG. 6 is a partially exploded view of the upper and lower tool inserts and cap strips.

As the lower and upper tool inserts 50 and 52 are aligned and placed together, one surface of each of the lower and upper U-shaped channels 36 and 38 are placed in contact with each other, forming the central web 22 of the sine wave spar 20 (FIGS. 1 and 9). Due to the rounded edges of the lower and upper tool inserts 50 and 52 and, thus U-shaped channels 36 and 38, a triangular gap 53 (FIG. 12) is formed along both edges of the intersection between the joined surfaces of lower and upper U-shaped channels 36 and 38. The triangular gaps 53 are filled using the left and right radius fillers 40 and 42 (FIG. 5). The radius fillers 40 and 42 are placed in the triangular gaps 53 and secured by the natural tack of the composite prepreg. The insertion and fabrication of the radius fillers 40 and 42 are described in detail below. After the radius fillers 40 and 42 are in place, the left and right cap strips 44 and 46 are placed in contact with the joined flanges of the U-shaped channels 36 and 38 and radius fillers 40 and 42 as best seen in FIGS. 6 and 12.

After the left and right cap strips 44 and 46 are in place, left and right side rail tools 60 and 62 (FIG. 7) are placed adjacent to the left and right cap strips 44 and 46. The left and right side rail tools 60 and 62 have rigid forming surfaces 67 (FIGS. 7 and 9) corresponding to the shape of the formed sine wave spar 20. The left and right side rail tools 60 and 62 rest upon the base plate 57. The forming surfaces 67 of the side rail tools 60 and 62 define the dimensions of the exterior surfaces of the formed spar caps 24 and 26 (FIG. 1).

Depending upon the application, the left and right side rail tools 60 and 62 may be allowed to float, i.e., move in and out toward and away from the lower and upper tool inserts 50 and 52, during processing. Alternately, the left and right side rail tools 60 and 62 may be indexed into a predetermined position by indexing pins 63 (FIGS. 3 and 4) extending upward from the base plate 57. The indexing pins 63 are received within recesses (not shown) in the lower surface of the side rail tools 60 and 62.

Figure 7:
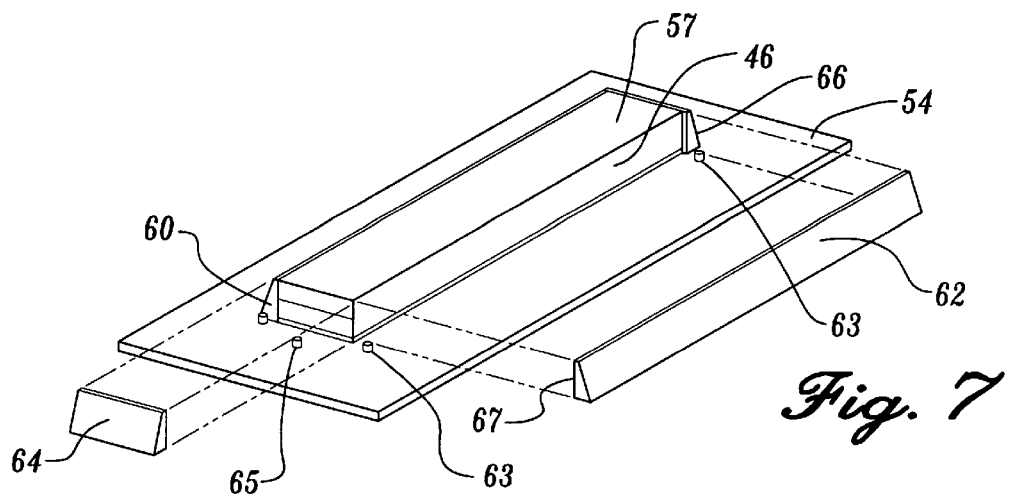
FIG. 7 is a partially exploded view of the upper and lower tool inserts and side rail tools.

After the side rail tools 60 and 62 are in place, end tools 64 and 66 may be placed on the opposite ends of the lower and upper tool inserts 50 and 52 (FIG. 7). The end tools 64 and 66 are indexed in place by indexing pins 65 that extend upward from the base plate 57. The indexing pins 65 engage recesses (not shown) in the lower surface of the end tools 64 and 66. Depending on the application, end tools may not be needed.

Figure 8:
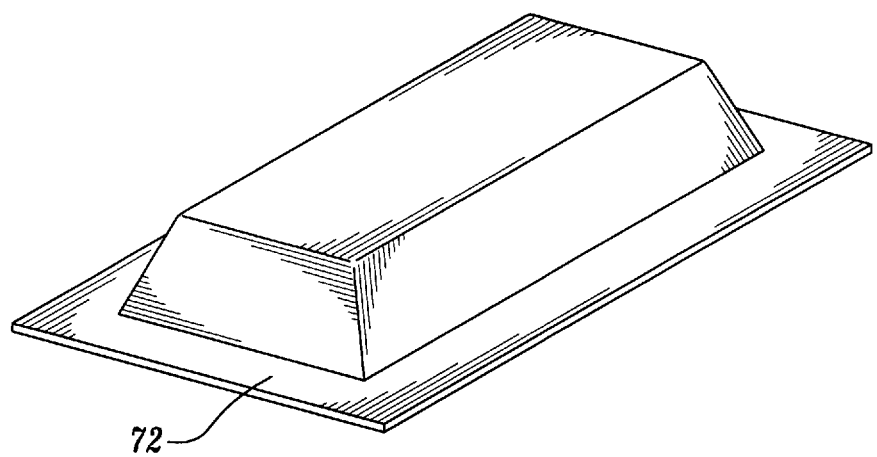
FIG. 8 is a perspective view of the assembled sine wave spar tooling.

The lower and upper tool inserts 50 and 52, side rail tools 60 and 62, and end tools 64 and 66 surround the composite material forming the composite workpiece that is to form the sine wave spar 20. As illustrated in FIG. 8, after the tooling is in place, the entire assembly, including tooling and composite workpiece, is covered by a fiberglass breather material (FIGS. 8 and 9). The fiberglass breather material 72 partially covers the surface of the base plate 57 and extends over the top of the left and right side rail tools 60 and 62, end tools 64 and 66, and upper tool insert 52. A vacuum bag 74 (FIG. 9) is then placed over the top of the fiberglass breather material 72 and sealed to the base plate 57 along its edges using sealing material 76 in a manner well known in the art.

As known in the art, it is advantageous to remove air and volatiles, produced during the processing of the composite material, from the interior of the vacuum bag 74. In the preferred embodiment, air and volatiles within the vacuum bag 74 are removed by withdrawing them through exhaust ports 78 (FIG. 9) that extend upward through the base plate 57 and open into the interior of the vacuum bag 74. After the composite workpiece is vacuum bagged, the combined tooling assembly and composite workpiece is placed within an autoclave (not shown) and the exhaust ports 78 are attached to the vacuum exhaust (not shown) of the autoclave. The autoclave is then closed and the interior of the autoclave is pressurized and heated in accordance with the processing requirements of the composite material used.

During processing, a vacuum is placed on the exhaust ports 78 to evacuate the interior of the vacuum bag 74. The vacuum may be placed on the exhaust ports 78 through the use of any appropriate vacuum device, such as the vacuum pump system of the autoclave. The combined pressure produced by the evacuation of the vacuum bag 74 and the pressurization of the autoclave produces a hydrostatic force that presses the upper tool insert 52 downward and the side rail tools 60 and 62 inward as illustrated by arrows 75 and 77 (FIG. 9). As the tools are pressed downward and inward, the forming surfaces of the tools contact the composite workpiece and compress the workpiece in order to consolidate it. In addition to pressurizing the autoclave, the interior of the autoclave, and thus tooling and composite workpiece are heated to an appropriate processing temperature. The pressure and temperature within the autoclave are maintained in accordance with the processing parameters of the composite material until it is fully consolidated and cured.

The consolidation and cure cycles for various composite materials are readily known by those of ordinary skill in the art. The consolidation and cure cycles differ depending upon the material used and are available from the manufacturers of the composite materials used. In the preferred embodiment, the composite material used was a composite prepreg material having a thermal set epoxy matrix and graphite reinforcing fibers. However, the invention is not limited to particular material systems and may be used with other composite materials, such as polyeimides, thermoplastics, etc.

Although the fabrication of the preferred embodiment is described with respect to the use of an autoclave, other methods can also be used to process the composite materials. For example, in some fabrication methods the tooling assembly is heated through the use of heating elements embedded within the tools, inductive heating, or through the use of other heating methods. Similarly, although in the preferred embodiment an autoclave is used to apply a consolidation pressure to the composite workpiece, a mechanical apparatus, such as a press, could also be used.

In the invention, the pulloff strength between the cap strips 44 and 46 and the layers of composite material forming the lower and upper U-shaped channels 36 and 38 is increased through the use of radius fillers 40 and 42 formed of titanium (See FIGS. 1 and 12). In prior art composite parts, the radius fillers are formed of unidirectional fibers that are pulltruded or otherwise formed into the shape of the triangular gap 53 formed between the two U-shaped channels 36 and 38. The large concentration of unidirectional fibers results in the radius filler's greater stiffness than the surrounding composite structure. This causes a stress concentration to be developed in the region of the radius fillers during loading of the resulting composite part. This stress concentration is believed to be one of the factors that results in poor pulloff strengths between the cap strips 44 and 46 and web plies that form the caps or flanges of the composite part.

In the invention, the radius fillers 40 and 42 are formed of titanium to help reduce the stress concentrations in the region of the radius filler. Titanium has material properties that are generally compatible with the material properties of the composite structure used in highly-stressed locations, such as the intersections between the webs and caps or flanges of spars, ribs, etc. The thermal expansion characteristics of titanium are also generally compatible with the thermal expansion characteristics of most composite materials in their typical operating temperature range. Thus, replacing prior art unidirectional composite radius fillers with titanium radius fillers helps to reduce the stress concentrations in the region of the radius filler during loading of the formed composite part.

In addition to reducing stress concentrations, unlike the prior art composite radius fillers, titanium radius fillers have generally homogeneous material properties. Composite radius fillers on the other hand have good stiffness and strength in the direction of the unidirectional fibers but depend entirely upon the cured resin within the radius fillers to provide strength and stiffness in directions out of the plane of the unidirectional fibers. Thus, the homogeneous material properties of the titanium radius fillers add strength and stiffness out of plane to the interface between the shear web and flanges or caps of the composite structure.

Figure 10:
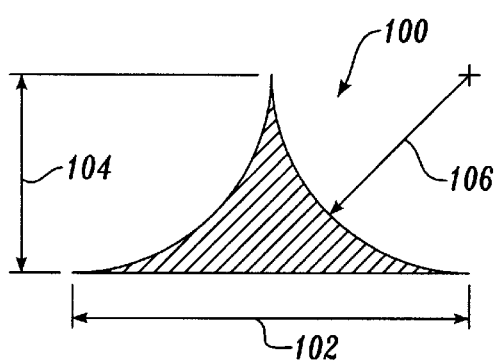
FIG. 10 is a cross-section of a radius filler formed in accordance with the invention.
Figure 11:
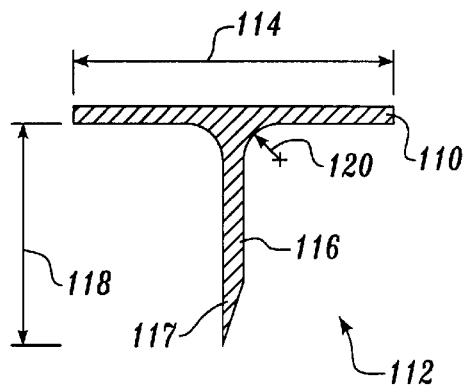
FIG. 11 is a cross-section of another embodiment of a radius filler formed in accordance with the invention.

Two preferred embodiments of titanium radius fillers according to the invention are illustrated in FIGS. 10 and 11. The radius filler 100 (FIG. 10) is configured to be used in applications where the corners of the U-shaped channels have large radiuses of curvature while the radius filler 112 (FIG. 11) is configured to be used when the U-shaped channels are fabricated with smaller radiuses of curvature.

As illustrated in FIG. 10, the radius filler 100 has two arcuate edges and a relatively planar edge. The arcuate edges are joined at one end and arch outward and are joined at the opposite ends of the planar edge to form a relatively triangular radius filler. The radius filler 112 has a T-shaped cross-section formed of a cap 110 and a web 116 extending approximately normal to the center of the cap.

In one exemplary embodiment of the invention, the radius filler 100 was fabricated with a width 102 of approximately 0.75 inches, a height 104 of approximately 0.375 inches, and a radius of curvature 106 of approximately 0.375 inches. In another embodiment of the radius filler 100, the width 102 was approximately 1.08 inches, the height 104 was approximately 0.54 inches, and the radius of curvature 106 was approximately 0.54 inches. In an exemplary embodiment of the radius filler 112 illustrated in FIG. 11, the cap 110 of the radius filler 112 had a width 114 of 3.1 inches and a thickness of approximately 0.125 inches. The web 116 of the radius filler had a length 118 of 1.5 inches and a thickness of approximately 0.050 inches. The radius of curvature 120 of this embodiment was approximately 0.19 inches. In addition, the outermost edge 117 of the web 116 was tapered in order to prevent the creation of resin-rich areas at the end of web.

As illustrated in FIG. 12, the titanium radius filler 40 is placed in the gap 53 between the U-shaped channels 36 and 38 and the cap strips 46. It is important that the cross-section of the radius filler 40 be carefully configured so that it properly fills the gap 53 without a creation of large resin-rich areas and without improperly displacing the layers of composite material forming the U-shaped channels 36 and 38 and cap strip 46. It is important that the surface of the titanium radius filler be properly treated to ensure a good bond between the resin system within the composite prepreg and the exterior surfaces of the radius filler.

In the preferred embodiment, both the configurations 100 and 112 for the radius fillers illustrated in FIGS. 10 and 11 were used to form I-beams out of an epoxy-based thermal set composite material. The surfaces of the titanium radius fillers were treated with a chromic acid anodizing method as commonly known in the art for treating titanium. The radius fillers 40 were then inserted into the gap 53 formed between the U-shaped channels 36 and 38 during fabrication of the composite I-beams. The resulting composite workpieces were vacuum bagged and cured in accordance with the recommended processing parameters for the composite material used.

Similar composite I-beams were formed from the same composite materials using a unidirectional composite radius filler. The resulting I-beams were cut into test coupons and tested to record their pulloff strengths. The test coupons incorporating a titanium radius filler 40 in accordance with the invention resulted in approximately a 49 percent improvement in pulloff values as compared to the baseline composite test coupons.

The titanium radius filler 40 can be used with composite parts formed of either unidirectional or cloth composite prepreg materials. In addition, the titanium radius filler 40 can be used with various composite materials including thermal set and thermoplastic composite material systems.

The titanium radius filler 40 can be formed by any appropriate fabrication method including casting and subsequent milling, wire forming, etc. In addition, the surface of the formed radius filler may be treated in any appropriate manner that allows the composite material system used to adhere to the surface of the titanium radius filler.

Although the preferred embodiment of the invention has been described with respect to a sine wave spar, the invention could also be used in the formation of composite I-beam spars or ribs, skin/spar interfaces, bulkhead/flange interfaces, etc. The present invention could also be used in additional embodiments to form other types of interfaces in composite parts. For example, FIGS. 13 and 14 show two additional embodiments of the invention used to form T-shaped intersections in a composite part.

Figure 13:
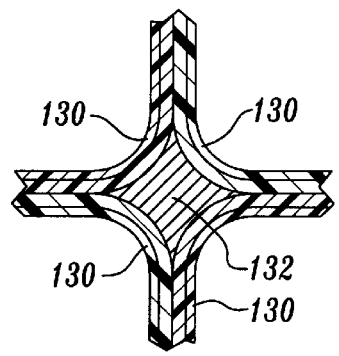
FIG. 13 is a cross-section of yet another embodiment of a radius filler formed in accordance with the invention.

In the embodiment illustrated in FIG. 13, four L-shaped composite preforms 130 are joined to form a composite part having a cross-shaped cross-sectional area. In this embodiment, a titanium radius filler 132 having a generally cross-shaped cross-section is used to fill the gap formed at the intersection between the four composite subassemblies 130. In the embodiment illustrated in FIG. 13, the radius filler 132 has four arcuate sides that are joined at their ends to form the cross-section of the radius filler.

Figure 14:
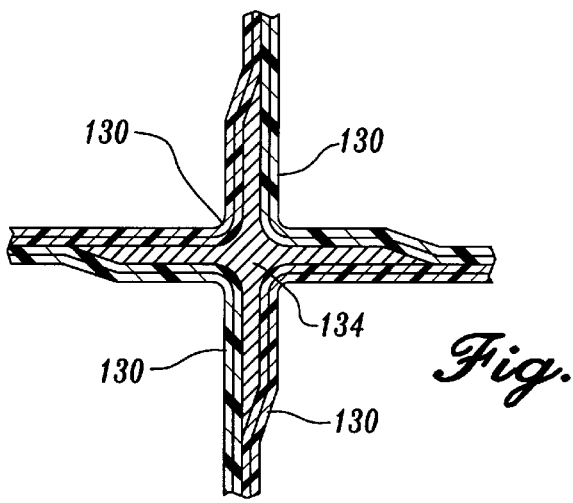
FIG. 14 is a cross-section of yet another embodiment of a radius filler formed in accordance with the invention.

In the embodiment illustrated in FIG. 14, four L-shaped subassemblies 130 are joined along their edges and a radius filler 134 having a cross-shaped cross-section is used. In the embodiment illustrated in FIG. 14, the radius filler has straight edges that form a cross and the ends of each of the edges is tapered.

In general, the invention can be used to increase the pulloff strength of any composite parts having abrupt intersections. Thus, the present invention can be used to form numerous composite parts having different geometries. While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of forming a composite part comprising:
   (a) forming two channel structures from layers of fiber-resin composite material, each channel structure having at least one peripheral flange and a shear web;
   (b) joining the two channel structures along the shear webs such that a gap is formed between the adjacent peripheral flanges;
   (c) forming a radius filler from titanium, the radius filler having a cross-sectional configuration to allow it to fill the gap formed between the peripheral flanges of the joined channel structures;
   (d) treating the surface of the titanium radius filler to allow the resin matrix material within the fiber-resin composite material to adhere to the treated surface of the titanium radius filler during curing;

(e) placing the titanium radius filler into the gap formed between the peripheral flanges of the joined channel structures;

(f) placing additional layers of fiber-resin composite material over the radius filler and the peripheral flanges to form a composite workpiece; and (g) curing the composite workpiece to form the composite part.

2. The method of claim 1, wherein the channel structures have a U-shaped cross-section and the method further comprising joining the two channel structures along the shear webs to produce a part having a cross-section.

3. The method of claim 2, further comprising forming the U-shaped channel structures with shear webs having a sine wave contour.

4. The method of claim 2, wherein the U-shaped channel structures are joined to form a I-beam spar in which the peripheral flanges form spar caps and the shear webs form a central web for the I-beam spar.

5. The method of claim 1, further comprising forming the titanium radius filler with a T-shaped cross-section.

6. The method of claim 1, further comprising forming the titanium radius filler so that it has one approximately flat side and two curved sides, the curved sides being joined to each other at one end and curving outward and being joined to the opposing ends of the flat side at the other ends.

7. The method of claim 1, wherein a portion of the channel structures have an L-shaped cross-section and the method further comprising joining three or more of the channel structures together with the titanium radius filler filling the gap formed between the joined channel structures.

8. The method of claim 1, further comprising forming the titanium radius filler with a cross-shaped cross-section.

9. The method of claim 1, wherein treating the surface of the titanium radius filler comprises chromic acid anodizing the surface of the titanium radius filler.

10. A method of forming a composite part having a cross-section, the method comprising:

(a) forming upper and lower U-shaped channels from layers of fiber-resin composite prepreg material, each channel having opposing flanges that extend upward from a centrally located shear web;

(b) placing the two U-shaped channels together along one side of the shear webs to form a workpiece having a cross-section;

(c) forming a radius filler from titanium, the radius filler having a cross-sectional configuration that is approximately the same as the configuration of a gap formed between the opposing flanges of the U-shaped channels after they have been joined;

(d) treating the surface of the titanium radius filler to allow the matrix material within the composite U-shaped channels to adhere to the surface of the radius filler during curing;

(e) placing additional layers of composite material over the radius filler and flanges of the U-shaped channels after the U-shaped channels have been joined and the radius filler is in place to form a composite workpiece; and (f) curing the composite workpiece to form an integral composite part having a titanium radius filler.

11. The method of claim 10, further comprising forming the U-shaped channels with shear webs having a sine wave contour.

* * * * *

UNITED STATES PATENT AND TRADEMARK OFFICE
CERTIFICATE OF CORRECTION

PATENT NO.   : 5,833,786
DATED        : November 10, 1998
INVENTOR(S)  : D.A. McCarville et al.

It is certified that error appears in the above-indentified patent and that said Letters Patent is hereby corrected as shown below:

ON THE TITLE PAGE:

| COLUMN | LINE | | |
|---|---|---|---|
| Item [56] Pg. 1, col. 2 | Refs. Cited (U.S. Patents, Item 7) | "Mccarville" should read --McCarville-- | |

Signed and Sealed this

Tenth Day of August, 1999

Attest:

Attesting Officer

Q. TODD DICKINSON

Acting Commissioner of Patents and Trademarks